United States Patent
Tung et al.

(10) Patent No.: US 9,706,394 B2
(45) Date of Patent: Jul. 11, 2017

(54) COMMUNICATING MESSAGES WITH INTERMITTENTLY AVAILABLE ENCRYPTION CREDENTIALS

(71) Applicant: Apple Inc., Cupertino, CA (US)

(72) Inventors: Berkat S. Tung, San Jose, CA (US); Daniel B. Pollack, San Francisco, CA (US); Hyeonkuk Jeong, Saratoga, CA (US); Joe S. Abuan, Cupertino, CA (US); Pierre J. De Filippis, San Jose, CA (US); Yan Yang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 10 days.

(21) Appl. No.: 14/841,226

(22) Filed: Aug. 31, 2015

(65) Prior Publication Data

US 2016/0262016 A1    Sep. 8, 2016

Related U.S. Application Data

(60) Provisional application No. 62/129,738, filed on Mar. 6, 2015.

(51) Int. Cl.
*H04L 29/06* (2006.01)
*H04W 12/02* (2009.01)
(Continued)

(52) U.S. Cl.
CPC ......... *H04W 12/02* (2013.01); *H04L 63/0428* (2013.01); *H04L 9/0841* (2013.01); *H04L 63/0435* (2013.01); *H04L 67/24* (2013.01)

(58) Field of Classification Search
CPC .. H04W 12/02; H04L 63/0428; H04L 9/0841; H04L 63/0435; H04L 67/24
(Continued)

(56) References Cited

U.S. PATENT DOCUMENTS

| 6,889,321 B1 | 5/2005 | Kung et al. |
| 8,606,933 B1 | 12/2013 | Gossweiler, III et al. |

(Continued)

FOREIGN PATENT DOCUMENTS

| WO | 2008019353 | 2/2008 |
| WO | 2012166990 | 12/2012 |

OTHER PUBLICATIONS

Extended European Search Report for European Patent Application No. 15202035.0, Jul. 15, 2016, pp. 1-10.
(Continued)

*Primary Examiner* — Michael S McNally
(74) *Attorney, Agent, or Firm* — Meyertons Hood Kivlin Kowert & Goetzel, P.C.; Jeffrey C. Hood; Joel L. Stevens

(57) ABSTRACT

Some embodiments relate to a device that transmits/receives encrypted communications with another device. A first device, such as a smart phone or smart watch, may generate a message associated with a certain data class, which may determine the security procedure used in the communication of the message. The first device may establish an encryption session for the purpose of communicating the message to a second device. Prior to sending the message, the first device may wait until encryption credentials are accessible according to certain conditions, which may be determined at least in part by the data class of the message. Similarly, after receiving the message, the second device may not be able to decrypt the message until encryption credentials are accessible according to certain conditions, which may be determined at least in part by the message data class.

20 Claims, 4 Drawing Sheets

(51) Int. Cl.
  *H04L 29/08*   (2006.01)
  *H04L 9/08*    (2006.01)
(58) Field of Classification Search
  USPC .......................................................... 380/270
  See application file for complete search history.

(56) References Cited

U.S. PATENT DOCUMENTS

| | | |
|---|---|---|
| 2004/0249953 A1 | 12/2004 | Fernandez et al. |
| 2010/0019920 A1 | 1/2010 | Ketari |
| 2011/0305340 A1 | 12/2011 | Eisenbach |
| 2014/0189861 A1* | 7/2014 | Gupta .................... H04L 63/08 726/22 |
| 2014/0334271 A1 | 11/2014 | Park et al. |

OTHER PUBLICATIONS

Chris Robison et al., "Private Facebook Chat," Privacy, Sercurity, Risk and Trust (PASSAT), 2012 International Conference on and 2012 International Conference on Social Computing (SOCIALCOM), IEEE, Sep. 3, 2012, pp. 451-460.

Korean Intellectual Property Office (including English translation); Notice of Preliminary Rejection; Feb. 9, 2017; 18 pages.

KT Corporation; Korean Patent Application No. 10-0763756 (including English translation); published Oct. 4, 2007; 29 pages.

* cited by examiner

COMMUNICATING MESSAGES WITH INTERMITTENTLY AVAILABLE ENCRYPTION CREDENTIALS

PRIORITY INFORMATION

This application claims priority to U.S. provisional patent application Ser. No. 62/129,738, titled "Communicating Messages with Intermittently Available Encryption Credentials," filed Mar. 6, 2015, which is hereby incorporated by reference in its entirety as though fully and completely set forth herein.

FIELD

The present application relates to encrypted communications between two devices, including to a method by which messages may be securely conveyed between two devices when their encryption credentials are intermittently available.

DESCRIPTION OF THE RELATED ART

Wireless communication systems are rapidly growing in usage. Further, wireless communication technology has evolved from voice-only communications to also include the transmission of data, such as Internet and multimedia content. In some applications, a level of confidentiality may be desired in communications of certain types of data. Encryption techniques have been used to encrypt sensitive data that is being transferred between two devices. However, improvements in the field are desired.

SUMMARY

Embodiments are presented herein of apparatus, systems, and methods by which encrypted communications may be conveyed between two devices. In some embodiments, a first device, such as a smart phone or smart watch, may generate a message associated with a certain data class, which may determine the security procedure used in the communication of the message. The first device may establish an encryption session for the purpose of communicating the message to a second device. Prior to sending the message, the first device may wait until encryption credentials are accessible according to certain conditions, which may be determined at least in part by the data class of the message. Similarly, after receiving the message, the second device may not be able to decrypt the message until encryption credentials are accessible according to certain conditions, which may be determined at least in part by the message data class.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

Figure 1:
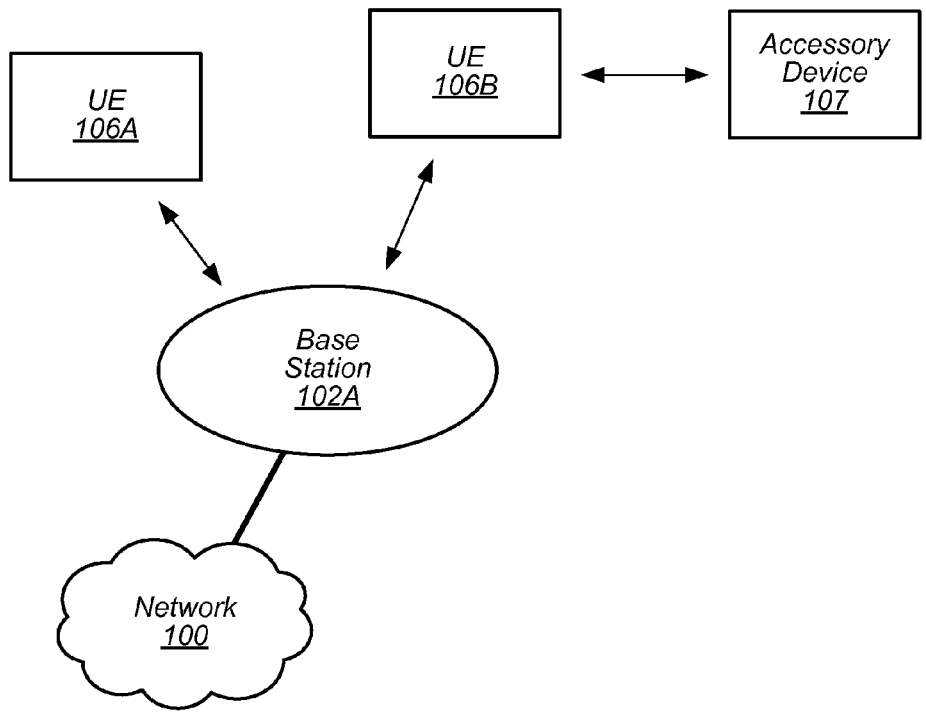
FIG. 1 illustrates an example wireless communication system.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

The term "configured to" is used herein to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke interpretation under 35 U.S.C. §112(f) for that unit/circuit/component.

DETAILED DESCRIPTION

Terminology

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" (also called "eNB") has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

FIG. 1—Wireless Communication System

FIG. 1 illustrates an example of a wireless communication system according to some embodiments. It is noted that FIG. 1 represents one possibility among many, and that features of the present disclosure may be implemented in any of various systems, as desired.

As shown, the exemplary wireless communication system includes a base station 102A, which communicates over a transmission medium with one or more wireless devices 106A, 106B, etc. Wireless devices may be user devices, which may be referred to herein as "user equipment" (UE) or UE devices.

The base station 102 may be a base transceiver station (BTS) or cell site, and may include hardware that enables wireless communication with the UE devices 106A and 106B. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the UE devices 106 and/or between the UE devices 106 and the network 100. In other implementations, base station 102 can be configured to provide communications over one or more other wireless technologies, such as an access point supporting one or more WLAN protocols, such as 802.11a, b, g, n, ac, ad, and/or ax, or LTE in an unlicensed band (LAA).

The communication area (or coverage area) of the base station 102 may be referred to as a "cell." The base station 102 and the UEs 106 may be configured to communicate over the transmission medium using any of various radio access technologies (RATs) or wireless communication technologies, such as GSM, UMTS (WCDMA, TDS-CDMA), LTE, LTE-Advanced (LTE-A), HSPA, 3GPP2 CDMA2000 (e.g., 1×RTT, 1×EV-DO, HRPD, eHRPD), Wi-Fi, WiMAX etc.

Base station 102 and other similar base stations (not shown) operating according to one or more cellular communication technologies may thus be provided as a network of cells, which may provide continuous or nearly continuous overlapping service to UE devices 106A-N and similar devices over a wide geographic area via one or more cellular communication technologies.

Note that at least in some instances a UE device 106 may be capable of communicating using any of a plurality of wireless communication technologies. For example, a UE device 106 might be configured to communicate using one or more of GSM, UMTS, CDMA2000, WiMAX, LTE, LTE-A, WLAN, Bluetooth, one or more global navigational satellite systems (GNSS, e.g., GPS or GLONASS), one and/or more mobile television broadcasting standards (e.g., ATSC-M/H), etc. Other combinations of wireless communication technologies (including more than two wireless communication technologies) are also possible. Likewise, in some instances a UE device 106 may be configured to communicate using only a single wireless communication technology.

The UE 106 may be configured to communicate with another device, which may be referred to as an accessory device 107. The accessory device 107 may be any of various types of devices that has limited communications abilities, e.g., which may be link budget limited. Thus the accessory device 107 may in some instances utilize the UE 106B as a proxy for communication purposes with the base station 102A and hence to the network 100. The limitation on communication abilities of the accessory device 107 can be permanent, e.g., due to limitations on the radio access technologies (RATs) supported, or temporary, e.g., dues to conditions such as power limitations, inability to access a network, or poor reception.

Figure 2:
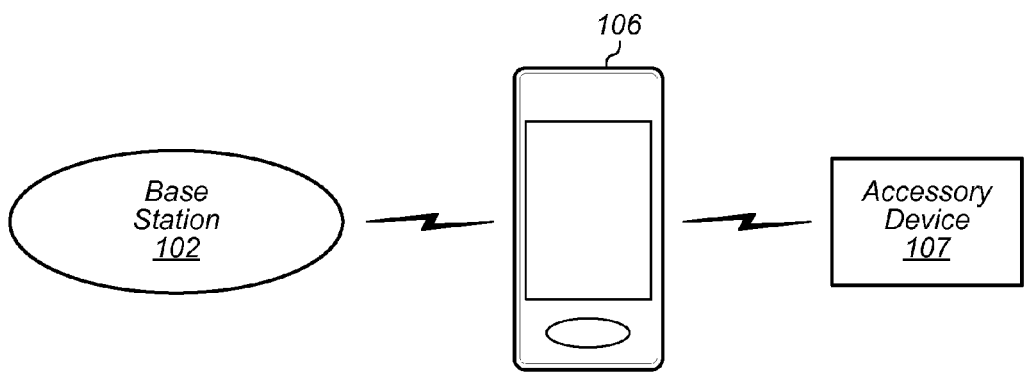
FIG. 2 illustrates an example wireless device such as UE acting as a message proxy for an unregistered device.

FIG. 2 illustrates an example UE device 106 (e.g., one of the devices 106A through 106N) in communication with base station 102. The UE device 106 may have cellular and/or WLAN communication capability, and as described above, may be a device such as a mobile phone, a hand-held device, a media player, a computer, a laptop or a tablet, or virtually any type of wireless device. As shown, the UE 106 may also be in communication with accessory device 107.

The UE device 106 may include a processor that is configured to execute program instructions stored in memory. The UE device 106 may perform any of the method embodiments described herein by executing such stored instructions. Alternatively, or in addition, the UE device 106 may include a programmable hardware element such as an FPGA (field-programmable gate array), or other circuitry, that is configured to perform any of the method embodiments described herein, or any portion of any of the method embodiments described herein.

The UE device 106 may include one or more antennas for communicating using one or more wireless communication protocols or technologies. In some embodiments, the UE device 106 might be configured to communicate using a single shared radio. The shared radio may couple to a single antenna, or may couple to multiple antennas (e.g., for MIMO) for performing wireless communications. Alternatively, the UE device 106 may include two or more radios. For example, the UE 106 might include a shared radio for communicating using either of LTE or 1×RTT (or LTE or GSM), and separate radios for communicating using each of Wi-Fi and Bluetooth. Other configurations are also possible.

The accessory device 107 may be any of various types of devices that has limited communication capabilities. For example, the accessory device 107 may have short range wireless communication capabilities such as Bluetooth and/or NFC, and/or medium range wireless communication capabilities, such as WiFi. In some embodiments, the accessory device 107 may have WiFi communication capabilities that are limited such that it can communicate through WiFi with the UE 106 when the UE 106 is in close proximity to the accessory device 107, such as peer-to-peer networking.

In some embodiments, the accessory device 107 is a smart watch or other type of wearable device. As another example, the accessory device 107 may be a tablet device, such as an iPad, with WiFi capabilities (and possibly no cellular communication capabilities) which is not currently near a WiFi hotspot and hence is not currently able to communicate over WiFi with the Internet. Thus, the term "accessory device" refers to any of various types of devices that in some instances have limited or reduced communication capabilities and hence may opportunistically utilize the UE 106 as a proxy for communication purposes for one or more applications and/or RATs. Then the UE 106 is used by the accessory device 107 as a proxy, and the UE 106 may be referred to as a companion device to the accessory device 107.

Figure 3:
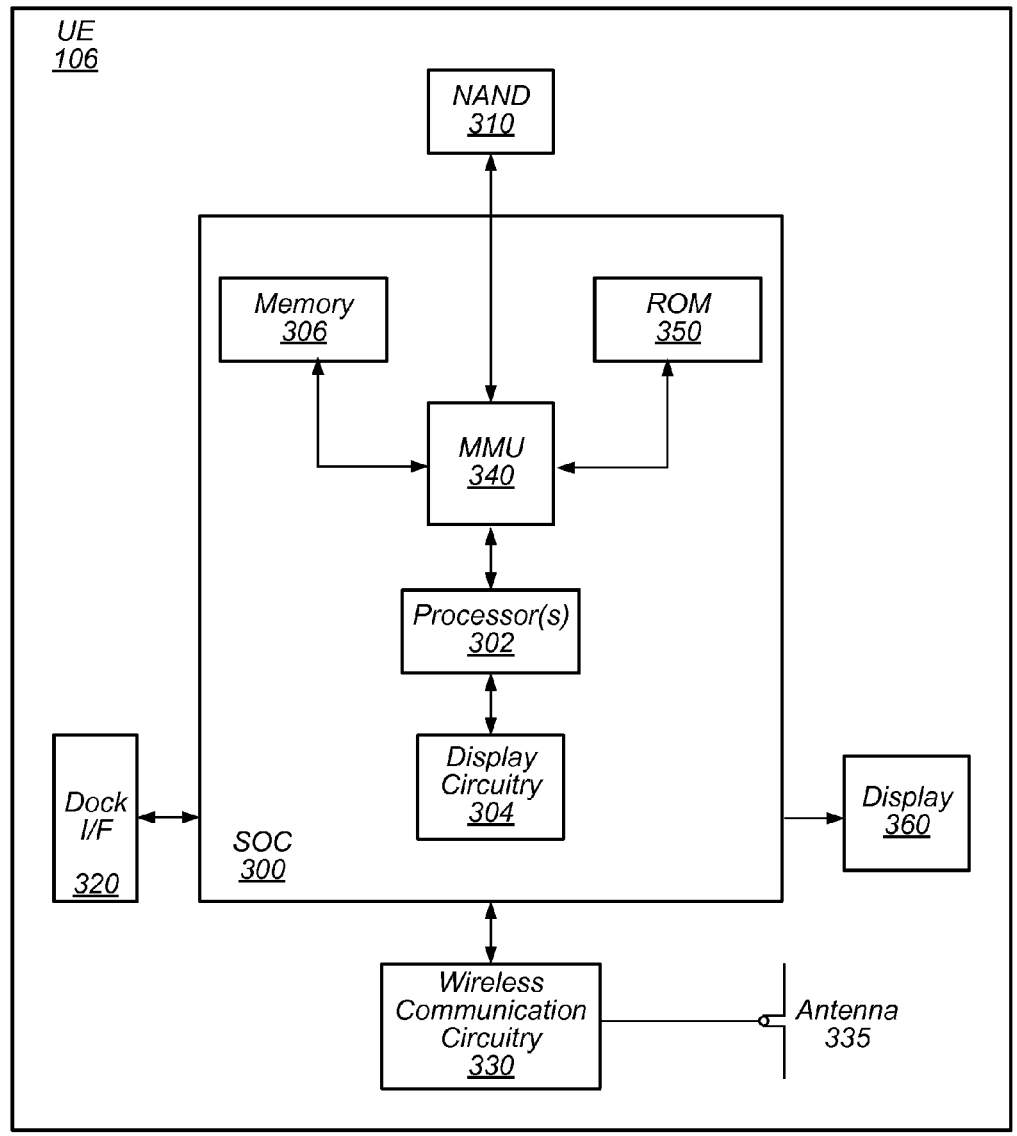
FIG. 3 is a block diagram illustrating an example User Equipment (UE) device according to some embodiments.

FIG. 3—Example Block Diagram of a UE

FIG. 3 illustrates one possible block diagram of a UE 106. As shown, the UE 106 may include a system on chip (SOC) 300, which may include portions for various purposes. For example, as shown, the SOC 300 may include processor(s) 302 which may execute program instructions for the UE 106, and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310). The MMU 340 may be configured to perform memory protection and page table translation or set up. In some embodiments, the MMU 340 may be included as a portion of the processor(s) 302.

The UE 106 may also include other circuits or devices, such as the display circuitry 304, radio 330, connector I/F 320, and/or display 360.

In the embodiment shown, ROM 350 may include a bootloader, which may be executed by the processor(s) 302 during boot up or initialization. As also shown, the SOC 300 may be coupled to various other circuits of the UE 106. For example, the UE 106 may include various types of memory (e.g., including NAND flash 310), a connector interface 320 (e.g., for coupling to a computer system), the display 360, and wireless communication circuitry (e.g., for communication using LTE, CDMA2000, Bluetooth, WiFi, NFC, GPS, etc.).

The UE device 106 may include at least one antenna, and in some embodiments multiple antennas, for performing wireless communication with base stations and/or other devices. For example, the UE device 106 may use antenna 335 to perform the wireless communication. As noted above, the UE may in some embodiments be configured to communicate wirelessly using a plurality of wireless communication standards.

As described herein, the UE 106 may include hardware and software components for implementing communication proxy methods on behalf of an accessory device according to embodiments of this disclosure. The processor 302 of the UE device 106 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit).

Figure 4:
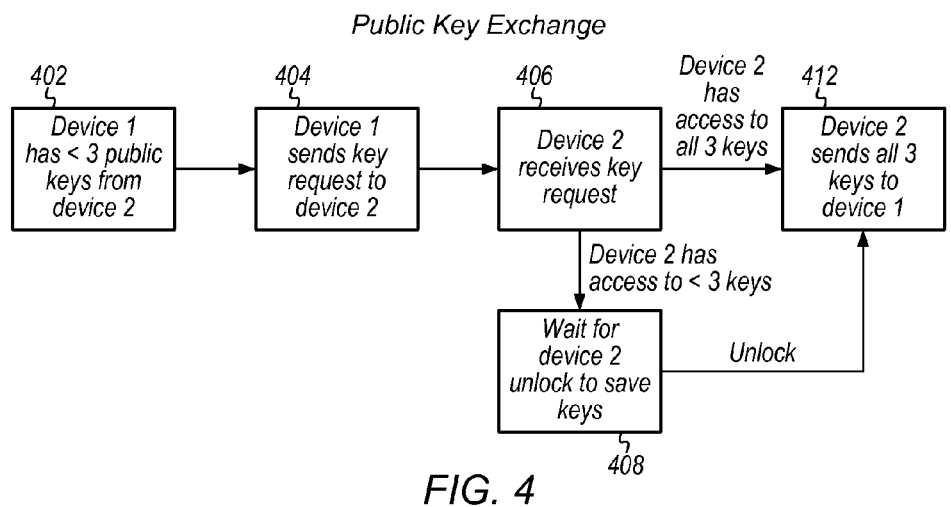
FIG. 4 is a flowchart diagram illustrating an example method by which public keys may be exchanged between two devices according to some embodiments.

FIG. 4—Public Key Exchange

FIG. 4 is a flowchart diagram illustrating an example method by which public keys may be exchanged between two devices for encrypted communications. In some embodiments the public keys may be associated with specific data classes. In these embodiments each public key may correspond to a different data class. Each data class may indicate a desired level of security to be used in communications associated with that data class and may also influence the accessibility of the associated public key.

At 402, the first device (device 1) may not have, or may not have access to, public keys to perform encrypted communications with the second device (device 2). For example, if communications between the two devices operate according to one of three data classes, each indicating a different level of security, then the first device may desire to have three public keys corresponding to the three data classes. In some scenarios, the first device may desire to convey a message to the second device as described below in regard to FIG. 6. This message may be associated with a certain data class, which may indicate the security level of the message. If the first device does not have (or have access to) the public key associated with the message data class, then it may desire to perform a public key exchange with the second device to obtain the public key in order to communicate the message. It is noted that although three public keys representing three data classes are presented in the example figure, any number of data classes or public keys may be used.

At 404, in response to having too few public keys as determined at 402, the first device may send a public key request to the second device. In some embodiments, the first device may wait until one or more conditions are met prior to sending the public key request. For example, the first device may wait until it is unlocked, and/or until other conditions are met, before sending the request. The one or more conditions may be determined in part by the data classes of the desired public keys.

After the second device receives the public key request as shown at 406, the second device may determine whether it has access to the requested public keys or the total number of public keys, e.g., all three public keys. In some embodiments the data classes associated with the public keys may determine their accessibility (i.e., availability). For example, for a first public key associated with a first data class indicating a high level of security, the second device may be unable to access the first public key if the second device is presently considered to be in a locked state. In some embodiments the second device may be considered to be locked if it is not being accessed by a user or if user action or credentials (e.g., a password/passcode, fingerprint, etc.) have not been received that would be required to operate it. For a second public key associated with a second data class, which may indicate a lower level of security, the second key may be accessible if the second device has been unlocked at some point in the past according to certain conditions, even though a user may not actively be operating the second device presently. For a third public key associated with a third data class indicating a lower level of security, the third public key may be accessible (i.e., available) regardless of the locked or unlocked state of the second device.

If the second device has access to fewer public keys than may be desirable or necessary for encrypted communications, e.g., less than three public keys, then operation proceeds to step 408, wherein the second device may wait until the inaccessible public keys become accessible, e.g., by the unlocking of the second device. In some embodiments, the first device may shift from a locked state to an unlocked state when the user provides input to access the device, such as pressing a button, interacting with a display, or providing credentials (e.g., a password/passcode, fingerprint, etc.).

In some embodiments, after the second device receives the public key request at 406, the second device may operate to generate new public keys. For example, the second device may not contain the desired public keys. In some scenarios the public keys may not have been shared between the two devices, previously exchanged public keys may have become obsolete, or the second device may otherwise desire to generate new public keys. At 408 the second device may wait until one or more conditions are met to generate, store, and access the public keys. The one or more conditions may be influenced by the data classes associated with the public keys and may comprise the conditions described above in regard to 406 and 408, such as the device being accessed or operated, the device being unlocked, or the device having been unlocked.

If or when the second device may access the public keys, at 412 it may convey the public keys (e.g., all three public keys) to the first device. The first device may store the public keys in internal memory according to their associated data classes. In this way, both the first device and the second device may contain public keys useable for subsequent secure communications.

FIG. 5—OTR Flow

Figure 5:
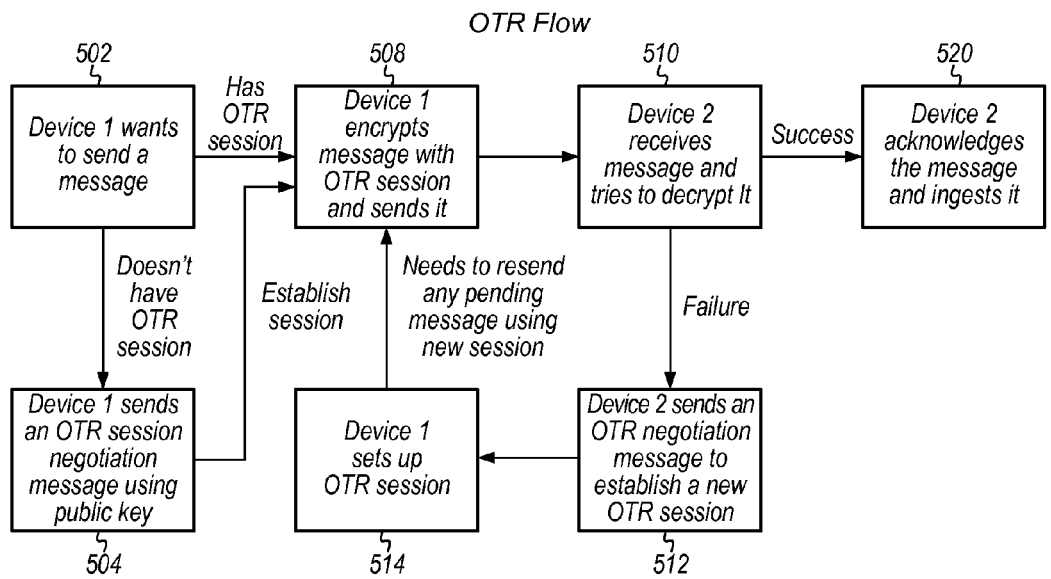
FIG. 5 is a flowchart diagram illustrating an example method by which encrypted messages may be communicated between two devices using Off-the-Record (OTR) messaging according to the prior art.

FIG. 5 illustrates an example method by which encrypted messages may be communicated between two devices using Off-the-Record (OTR) messaging according to the prior art.

At 502, the first device may desire to communicate a message to the second device. In some embodiments the message may be automatically generated by the first device, or may be generated in response to user input. The message may be associated with various applications and may comprise one or more of various forms of data, such as images, audio, video, text, or other data.

In order to send the message to the second device, the first device may determine whether it has an available OTR session with the second device. If the first device determines that it does not have an OTR session with the second device, it may initiate an OTR session as shown at 504. Here the first device may send an OTR session negotiation message to the second device using a public key for the purpose of establishing an OTR session. Once an OTR session is established (or if an OTR session was already available) then operation proceeds to 508.

At 508 the first device may encrypt a message with the OTR session, which may have been ongoing prior to the generation of the message or otherwise may have been established for the purpose of conveying the message at 504. The message may then be sent to the second device. At 510 the second device may receive the message and attempt to decrypt the message using the OTR session.

The second device may be unable to decrypt the message or the attempt at decryption may be unsuccessful. For example, the original OTR session may have become invalid, or the second device may otherwise be unable to decrypt the message. In this case, a new OTR session may be desired and operation proceeds to 512.

At 512 the second device may send an OTR negotiation message to the first device for the purpose of establishing a new OTR session. At 514, in response to the OTR negotiation message, the first device may establish a new OTR session to resend the message. After the new OTR session is established, operation returns to 508; the first device may encrypt the message with the new OTR session and resend it to the second device. If the second device is unable to decrypt the message, then the process wherein a new OCR session is established and the message is newly encrypted and resent may repeat until the message is successfully decrypted by the second device.

If at 510 the second device successfully decrypts the message, then at 520 the second device may process the message. The second device may send an acknowledgment to the first device, e.g., to notify the first device of the successful reception and decryption of the message. In some embodiments, the second device may operate to store or display data (or information) contained in the message or otherwise may handle the message according to its contents or associated application.

Figure 6:
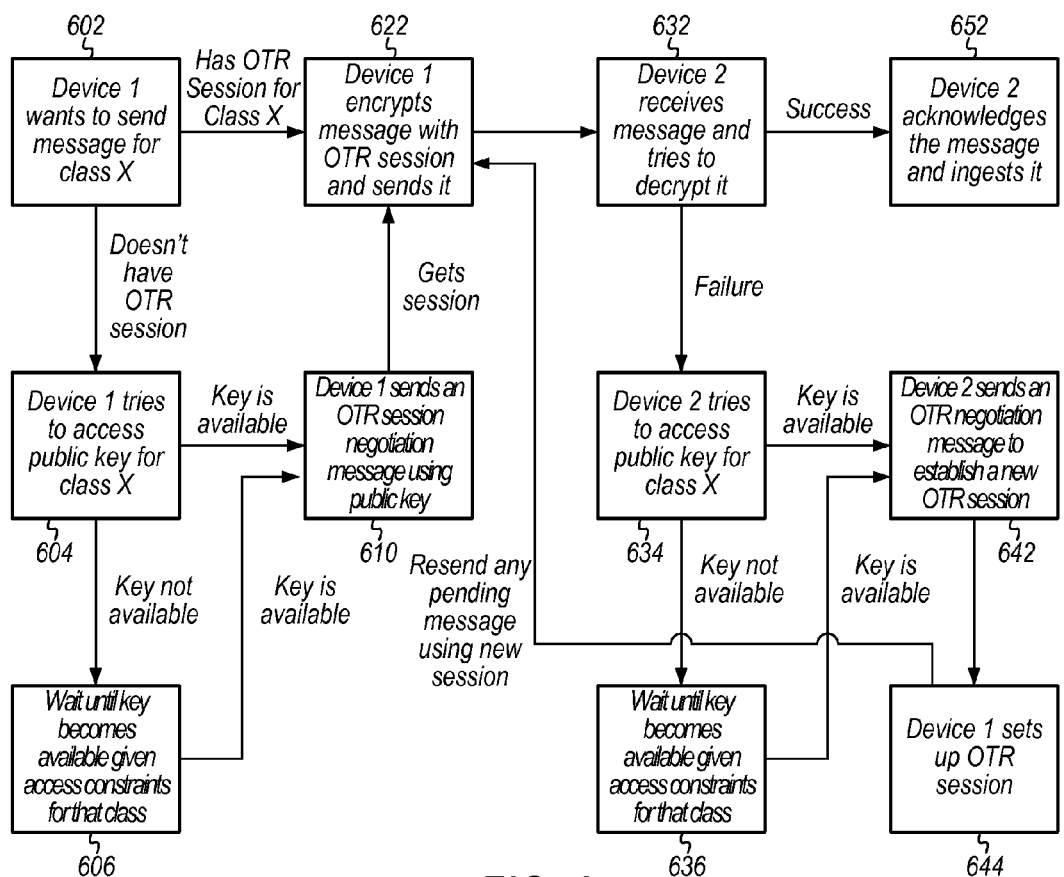
FIG. 6 is a flowchart diagram illustrating an example method by which encrypted messages may be communicated between two devices using Off-the-Record (OTR) messaging and multiple data classes according to some embodiments.

FIG. 6—OTR Flow with Multiple Data Classes

FIG. 6 illustrates an example method by which encrypted messages may be communicated between two devices using Off-the-Record (OTR) messaging. In some embodiments, the first device may be an accessory device, such as a smart watch. The accessory device may desire to communicate sensitive or confidential data to the second device, which may be a companion device such as a smart phone.

At step 602, the first device (device 1) may desire to communicate a message to the second device (device 2). In some embodiments the message may be automatically generated by the first device or may be generated in response to user input. The message may be associated with various applications and may include one or more of various forms of data, such as images, audio, video, text, or other data. The message may be associated with a specific data class, which may indicate a desired level of security to be used in the communication of the message. For example, the message may comprise sensitive data of a first data class, such as health-related data, or otherwise data associated with a data class for which some level of security is desired. The data class of the message (i.e., the message data class or the data class) may influence the method and/or level of security by which the message is encrypted and communicated. In some embodiments, each possible data class may use a different public key (or different public keys) for secure communications. In these embodiments multiple public keys may be used for multiple data classes.

Prior to communication of the message, the two devices may have performed a public key exchange as described above in relation to FIG. 4. After exchanging one or more public keys, the one or more public keys may be stored on both the first device and the second device. In some embodiments, the one or more public keys may be associated with particular data classes. The two devices may be unable to attempt secure communication of the message until they have performed the public key exchange for the public key associated with the same data class as the message (henceforth referred to as the correct public key, or simply the public key).

For the purpose of communicating the message to the second device, the first device may determine whether it has an available encryption session, e.g., an OTR session, with the second device for the message data class. For example, the devices may have exchanged earlier communications associated with the same data class using an ongoing OTR session. In this scenario the same OTR session may be usable for communication of the message and operation may proceed to 622 (described below).

In some scenarios a preexisting OTR session may have become obsolete or the first device may not have an ongoing OTR session with the second device for the correct data class. In these scenarios, it may be possible that one or more ongoing OTR sessions exist between the two devices but are not associated with the same data class as the message, and thus may operate under different security procedures and/or by different security credentials (e.g., keys). Hence, a new OTR session for the message data class may be desired.

If the first device determines that it does not have an ongoing OTR session with the second device for the message data class, then it may operate to initiate the OTR session. To do so, at 604 the first device may attempt to access the public key associated with the data class of the message. The access constraints for the message data class may determine the availability of the public key, i.e., whether the first device may access the public key. For example, if the message data class is a first data class indicating sensitive data, the public key may be available when the first device is unlocked. In some embodiments the first device may be considered to be in an unlocked state if it is being accessed by a user or if no action or credentials (e.g., a password/passcode, fingerprint, etc.) would be required for it to be accessed by a user, e.g., because such action has already been provided or because it does not require such action (e.g., because its settings indicate a low level of security). In some embodiments, the first device may shift from a locked state to an unlocked state when the user provides input to access the device, such as pressing a button, interacting with a display, or providing credentials (e.g., a password/passcode, fingerprint, etc.). In other scenarios, for example if the message data class comprises a second data class indicating less sensitive data, the public key may be available regardless of whether the first device is locked or unlocked.

If the first device determines that the public key is unavailable (i.e., inaccessible), then at 606 the first device may wait until the public key becomes available. If or when the first device is able to access the public key (e.g., because it has been unlocked), then at 610 it may send an OTR session negotiation message using the public key to the second device for the purpose of initiating an OTR session associated with the message data class with the second device.

After the OTR session is established (or if there was already an ongoing OTR session for the message data class at 602), then at 622 the first device may encrypt the message with the OTR session and communicate it to the second device.

At 632 the second device may receive the message and attempt to decrypt the message. The message data class may determine the availability of the message, e.g., the circumstances under which the second device may access one or more keys to decrypt the message. If the message data class comprises a first data class indicating sensitive data, then the second device may be unable to decrypt the message unless the second device is unlocked. In some embodiments the second device may be considered unlocked if the user has provided input to access the second device, such as pressing a button, interacting with a display, or providing credentials (e.g., a password/passcode, fingerprint, etc.), or if the second device is otherwise accessible or being operated by a user as described above in regard to 604.

It is possible that the second device may be unable to decrypt the message or the attempt at decryption may be unsuccessful. For example, the OTR session may have become invalid while the second device waited until the message became available for decryption, e.g., until the second device was unlocked. In some scenarios, the second device may not have, or may not have access to, security credentials useable to decrypt the message. The second device may otherwise be restricted from decrypting the message or be unable to decrypt the message.

If the second device is unable to decrypt the message, it may desire to establish a new OTR session with the first device. To do so, at 634 the second device may attempt to access the public key for the message data class. As described above in regard to step 604, the message data class may determine the access constraints (i.e., the availability)

of the public key. If the public key is unavailable (i.e., inaccessible), then at 636 the second device may wait until the public key becomes available, (i.e., accessible). For example, if the message data class comprises a first data class, the second device may be unable to access the public key until the second device is considered to be unlocked as described above in regard to steps 604 and 632. In some embodiments, the second device may require operation by the user to access the public key. Conversely, for a second data class indicating less strict security requirements the second device may be able to access the public key regardless of the state of operation of the second device or whether it is locked or unlocked.

If or when the public key is accessible by the second device, operation proceeds to 642. The second device may send an OTR negotiation message to the second device in order to establish a new OTR session for the message data class. At 644 the first device may operate to establish the new OTR session with the second device in response to the OTR negotiation message from the second device.

After the new OTR session is established, operation returns to 622, wherein the first device may encrypt the message using the new OTR session and resend the message to the second device. After receiving the message, the second device may attempt to decrypt it. If decryption is unsuccessful as described above in regard to 632, then the process described above may repeat wherein the second device may access the public key (at 634), a new OTR session may be established (at 642 and 644), and the first device may encrypt and resend the message (at 622).

If the second device successfully decrypts the message at 632, then at 652 the second device may process the message. The second device may operate to store or display information contained in the message or otherwise may handle the message according to its contents or associated application.

In response to successfully processing the message at 652 the second device may send an acknowledgment to the first device, e.g., to notify the first device of the successful reception and decryption of the message. In some embodiments, the first device may have limited the number of messages or amount of data sent to the second device prior to receiving this acknowledgment, so as not to overload the second device with incoming messages (which may consume memory and resources). In some embodiments this limiting may be influenced by information previously received from the second device, such as resource limitations, preferred restrictions, or other indications useable to determine one or more restrictions on the amount of data to be sent to the second device. If the first device has refrained from sending other outgoing messages to the second device according to these one or more restrictions, then the first device may respond to the acknowledgment by preparing to send one or more of the other outgoing messages. For example, if the second device has successfully processed the message, which may free up resources on the second device, and sends an acknowledgement to the first device, the first device may respond by conveying other messages to the second device.

For a portion of the period between the generation of the message at 602 and the successful reception and acknowledgment of the message at 652, the message may be stored on the first device in a data structure that stores outgoing messages, e.g., an outgoing message queue. In some embodiments, an Identity Services (IDS) daemon on the first device may comprise multiple outgoing message queues, i.e., an outgoing message queue for each data class. The circumstances under which the first device may remove the message from its outgoing message queue may be determined by the message data class. For example, if the message data class comprises a first data class indicating sensitive data, the first device may remove the message from the outgoing message queue when it receives acknowledgement from the second device of successful reception of the message as described above in regard to 652. For other data classes, the first device may remove the message from the outgoing message queue after sending the message to the second device, or otherwise at a time influenced by the message data class. By separating outgoing messages into different outgoing message queues according to their data classes, the first device may keep messages that require more security (and hence that may require more time to be successfully sent, received, and processed) from delaying the communication of messages that require less security. For comparison, if the first device were to have only one outgoing message queue to contain messages of various data classes, then the outgoing message queue may be burdened by messages that need to be decrypted by the second device before being removed from the outgoing message queue, which could delay the transmission of messages that do not require decryption.

Similarly, after the second device receives the message from the first device at 632, it may store the message in a data structure for incoming messages, e.g., an incoming message queue. In some embodiments, an Identity Services (IDS) daemon on the second device may comprise multiple incoming message queues, which may be associated with different data classes. The message may be stored in the incoming message queue of its data class. The message may be removed from the incoming message queue after being successfully decrypted and/or processed according to the data class. Messages of certain data classes may utilize potentially more time-consuming security procedures than messages of other data classes; thus, separating messages into different incoming message queues according to their data classes may allow for more efficient processing of messages.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement a method, e.g., any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A device, comprising:
   at least one antenna for performing wireless communication;
   at least one radio communicatively coupled to the at least one antenna, wherein the at least one radio is configured to perform communication using at least one radio access technology (RAT);
   one or more processors communicatively coupled to the at least one radio, wherein the one or more processors and the at least one radio are configured to perform wireless communications using the at least one antenna;
   wherein the device is configured to:
      generate a message, wherein encryption of the message is required before transmission;
      determine that one or more conditions are not met for the encryption, wherein the device is configured to wait until the one or more conditions are met before transmission;
      establish an encryption session with a second device in response to the one or more conditions being met, wherein the encryption session is useable to communicate the message to the second device;
      encrypt the message using encryption credentials of the encryption session to produce an encrypted message;
      transmit the encrypted message to the second device;
      store the message in an outgoing message queue prior to transmitting the message;
      receive an acknowledgement from the second device that the second device has processed the message; and
      remove the message from the outgoing message queue in response to the acknowledgement.

2. The device of claim 1,
   wherein, in determining that one or more conditions are not met for the encryption, the device is configured to determine that encryption credentials are inaccessible; and
   wherein the encryption credentials are associated with the encryption session, wherein the device is configured to wait until the encryption credentials are accessible before establishing the encryption session.

3. The device of claim 2,
   wherein the device is further configured to:
      determine it cannot access the encryption credentials;
      send a request to the second device for the encryption credentials.

4. The device of claim 1,
   wherein, in determining that one or more conditions are not met for the encryption, the device is configured to determine that it lacks one or more keys necessary for the encryption.

5. The device of claim 1,
   where the device comprises an accessory device, and wherein the second device comprises a companion device.

6. The device of claim 1,
   wherein the message is associated with a data class, wherein the data class determines at least in part the one or more conditions.

7. The device of claim 6,
   wherein the data class indicates a desired level of security to be used in communications associated with the data class.

8. The device of claim 1,
   wherein the one or more conditions comprise the device being unlocked.

9. An integrated circuit for inclusion in a device, the device comprising at least one antenna for performing wireless communication and at least one radio coupled to the at least one antenna;
   memory which stores a message, wherein an encryption session with a second device is required before transmission of the message;
   a processing element coupled to the memory, wherein the processing element is configured to:
      determine that one or more conditions are not met for the encryption session, wherein, in determining that one or more conditions are not met for the encryption, the processing element is configured to determine that encryption credentials are inaccessible, wherein the encryption credentials are associated with the encryption session, wherein the integrated circuit is configured to wait until the one or more conditions are met before transmission;
      establish the encryption session with a second device in response to the one or more conditions being met, wherein establishing the encryption session comprises waiting until the encryption credentials are accessible before establishing the encryption session, wherein the encryption session is useable to communicate the message to the second device;
      encrypt the message using the encryption session to produce an encrypted message; and
      wherein the encrypted message is operable to be communicated to the second device.

10. The integrated circuit of claim 9,
    wherein the processing element is further configured to:
       determine it cannot access the encryption credentials;
       send a request to the second device for the encryption credentials.

11. The integrated circuit of claim 9,
    wherein, in determining that one or more conditions are not met for the encryption, the processing element is configured to determine that it lacks one or more keys necessary for the encryption.

12. The integrated circuit of claim 9,
    wherein the message is associated with a data class, wherein the data class determines at least in part the one or more conditions.

13. The integrated circuit of claim 9,
    wherein the one or more conditions comprise the device being unlocked.

14. The integrated circuit of claim 9,
    wherein the processing element is further configured to:
       store the message in an outgoing message queue prior to communicating the message;
       receive an acknowledgement from the second device that the second device has processed the message; and
       remove the message from the outgoing message queue in response to the acknowledgement.

15. The integrated circuit of claim 9,
where the integrated circuit is adapted to be incorporated into an accessory device, and wherein the second device is a companion device.

16. A device, comprising:
at least one antenna for performing wireless communication;
at least one radio communicatively coupled to the at least one antenna, wherein the at least one radio is configured to perform communication using at least one radio access technology (RAT);
one or more processors communicatively coupled to the at least one radio, wherein the one or more processors and the at least one radio are configured to perform wireless communications using the at least one antenna;
wherein the device is configured to:
  receive an encrypted message from a second device;
  store the encrypted message in an incoming message queue on the device;
  determine that one or more encryption credentials are inaccessible, wherein the device is configured to wait until the one or more encryption credentials are accessible; and
  decrypt the encrypted message when the encryption credentials become accessible.

17. The device of claim 16,
where the device is a companion device, and wherein the second device is an accessory device.

18. The device of claim 16,
where the device is a smart phone, and wherein the second device is a smart watch.

19. The device of claim 16, wherein the device is further configured to:
in response to determining that the one or more encryption credentials are inaccessible, send a request to the second device for the encryption credentials.

20. The device of claim 16, wherein, in determining that one or more encryption credentials are inaccessible, the device is configured to determine that it lacks one or more keys necessary for the decryption.

* * * * *